United States Patent [19]
Merritt et al.

[11] Patent Number: 5,293,271
[45] Date of Patent: Mar. 8, 1994

[54] RETROCOLLIMATOR OPTICAL SYSTEM

[75] Inventors: Nelson A. Merritt, Pleasantville, N.Y.; Arden Strasser, New Haven, Conn.

[73] Assignee: Virtual Reality, Inc., Pleasantville, N.Y.

[21] Appl. No.: 868,521

[22] Filed: Apr. 15, 1992

[51] Int. Cl.[5] ................ G02B 27/10; G02B 17/06; G02B 5/10
[52] U.S. Cl. .................... 359/858; 359/869; 359/631; 359/633; 359/637; 434/44
[58] Field of Search .............. 359/858, 869, 631, 633, 359/637, 630; 434/44

[56] References Cited

U.S. PATENT DOCUMENTS

| Re. 28,847 | 6/1976 | Vizenor | 350/302 |
|---|---|---|---|
| 3,059,519 | 10/1962 | Stanton | 88/1 |
| 3,291,906 | 12/1966 | Ward | 358/250 |
| 3,549,803 | 12/1970 | Emerick et al. | 178/7.88 |
| 3,647,284 | 3/1972 | Elings et al. | 359/858 |
| 3,785,715 | 1/1974 | Mecklenborg | 350/55 |
| 3,833,300 | 9/1974 | Rymes | 356/13 |
| 3,870,405 | 3/1975 | Hedges | 350/294 |
| 3,923,370 | 12/1975 | Mostrom | 350/55 |
| 4,017,163 | 4/1977 | Glass | 359/365 |
| 4,026,641 | 5/1977 | Bosserman et al. | 350/298 |
| 4,081,209 | 3/1978 | Heller et al. | 350/174 |
| 4,153,913 | 5/1979 | Swift | 358/93 |
| 4,465,347 | 8/1984 | Task et al. | 350/538 |
| 4,761,056 | 8/1988 | Evans et al. | 27/14 |
| 5,134,521 | 7/1992 | Lacroix et al. | 359/631 |

OTHER PUBLICATIONS

Droessler & Rotier, "Tilted Cat Helmet-Mounted Display," Optical Engineering 29(8) 849-854, Aug. 1990.
LaRussa, "Guidance-Control-Navigation-Automation for Night All-Weather Tactical Operations", AGARD Conference Proceedings No. 389.
"Binocular Holographic Helmet-Mounted Display," NADC-77228-30, Dec., 1978.
Hoffman, "Wide Field of View Display System".
Robinett et al., "A Computational Model for the Stereoscopic Optics of a Head-Mounted Display," Presence vol. 1, No. 1 Winter, 1992.
Rallison & Schicker, "Combat Vehicle Stereo HMD".

*Primary Examiner*—Jon W. Henry
*Attorney, Agent, or Firm*—Gary S. Pisner

[57] ABSTRACT

An optical system for use in helmet mounted displays that consists of an image source, electronics that predistort the image emanating from the projector, a means for correcting for optical aberration that may be a lens or a fiber optic taper, and a reflective surface composed of a plurality of reflective surface elements with conic geometries. Light from the projector, corrected for optical aberrations, is directed into the first reflective surface element. Light from the first reflective surface element is reflected into a second reflective surface element and thereafter into the eye.

7 Claims, 9 Drawing Sheets

RETROCOLLIMATOR OPTICAL SYSTEM

BACKGROUND—FIELD OF INVENTION

This invention relates to an optical system consisting of an image source, a reflective surface consisting of spherical and/or paraboloid sections, and a means for correcting optical aberrations created by the reflective surface, mountable on a helmet and capable of projecting a virtual image into the eye.

BACKGROUND—DESCRIPTION OF THE RELATED ART

It is difficult to project a virtual image into the eyes of a person wearing the helmet when the image source, a CRT or an LCD display, is mounted on a helmet. To project an image from an image source mounted on the helmet into the eyes of a person wearing the helmet, one must create an optical system capable of conveying an image around the contours of the head into the eyes. To accomplish this, one can either mount the image source close to the eye and use a single reflective element to direct the image into eye or, alternatively, one can move the image source to the top or sides of the helmet and convey the image around the contours of the helmet by using a plurality of optical elements.

The first approach, mounting the image source close to the eye, creates several undesirable effects. For example, the placement of the image source close to the eye can obstruct the field of view of the person using the helmet mounted display. (See U.S. Pat. No. Re. 28,847 to Vizener (1984)). There are no such obstructions with the present invention.

Another problem with placing the image source near the eye is the eccentric distribution of weight towards the front of the helmet (See U.S. Pat. No. 4,026,641 to Bosserman (1977), and Swift U.S. Pat. No. 4,153,913 to Swift (1984)). When one moves the weight of the optical system to the front of the helmet, the helmet mounted display can become very uncomfortable to wear.

For a single reflector system, to avoid obstructions in the visual field of the person donning a helmet mounted display system and to reduce the requirement for mounting the image source on the front of the helmet, one must reduce the cross-section of the image source or move the image source far from the reflective element. This approach was used by Rymes U.S. Pat. No. 3,833,300 to Rymes (1974). There are no obstructions in the Rymes patent, however, because the image source has a small cross sectional area and is placed far from the reflective element, the light intensity of the image is very low. Mounting an image source with a large cross-sectional on the top or sides of the helmet mitigates the eccentric weight distribution, obstruction, and in many instances, low light intensity problems found in systems where the image source is close to the eyes.

With earlier related art, when the image source was mounted on the top or sides of the helmet, several optical elements were required to relay the image from the image source into the eyes. When the number of optical elements increase, in general, brightness of the image decreases, and the weight of the helmet, cost of maintenance, and cost of production increases. (See U.S. Pat. No. 3,059,519 to Stanton, U.S. Pat. No. 3,291,906 to Ward et al, U.S. Pat. No. 3,923,370 to Mostrom, U.S. Pat. No. 4,761,056 to Evans, U.S. Pat. No. 4,081,209 to Heller et al, U.S. Pat. No. 4,465,347 to Task et al.)

SUMMARY OF INVENTION

Accordingly, it is the object of the present invention to provide a mountable optical system that avoids the aforementioned problems of related art and to introduce a number of improvements including:

(a) The present invention permits the weight of the visor and projectors to be distributed on a helmet in a balanced configuration. Projectors can be mounted on the sides and the optical elements are light enough to be unencumbering.

(b) Due to the geometry of its retrocollimator optic, the present invention has a wide field of view (50 degrees at minimum). Other helmet mounted display optics do not permit a true wide field of view.

(c) The present invention has a higher resolution than other helmet mounted displays because of the use of reflective elements, rather than multiple refractive elements.

(d) The present invention's image brightness is superior to that of other systems because of brightness of the CRTs and the absence of optical elements that could cause the light from the image source to scatter.

(e) The present invention has a superior ease of assembly and maintenance because there are, at most, two image sources and, at most, two retrocollimator optics to assemble and adjust.

Thus, no other helmet mounted display optical system has such a combination of wide field of view, high resolving power, image brightness, ease of assembly and maintenance.

BRIEF DESCRIPTION OF DRAWINGS

In the drawings, closely related figures have the same number but different alphabetic suffixes.

FIG. 3A top view of retrocollimator optics and projectors mounted on a helmet.

FIG. 3C top view of projector mounted on helmet.

DESCRIPTION OF THE PREFERRED EMBODIMENT

Figure 1A:
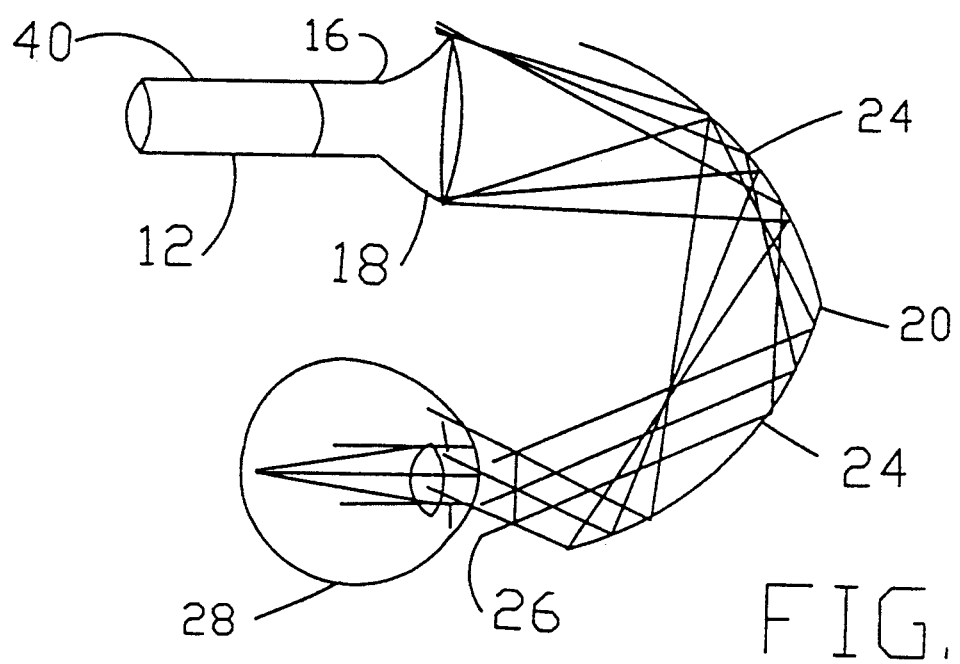
FIG. 1A ray trace of a retrocollimator optic with an upper and lower paraboloid section.
Figure 1B:
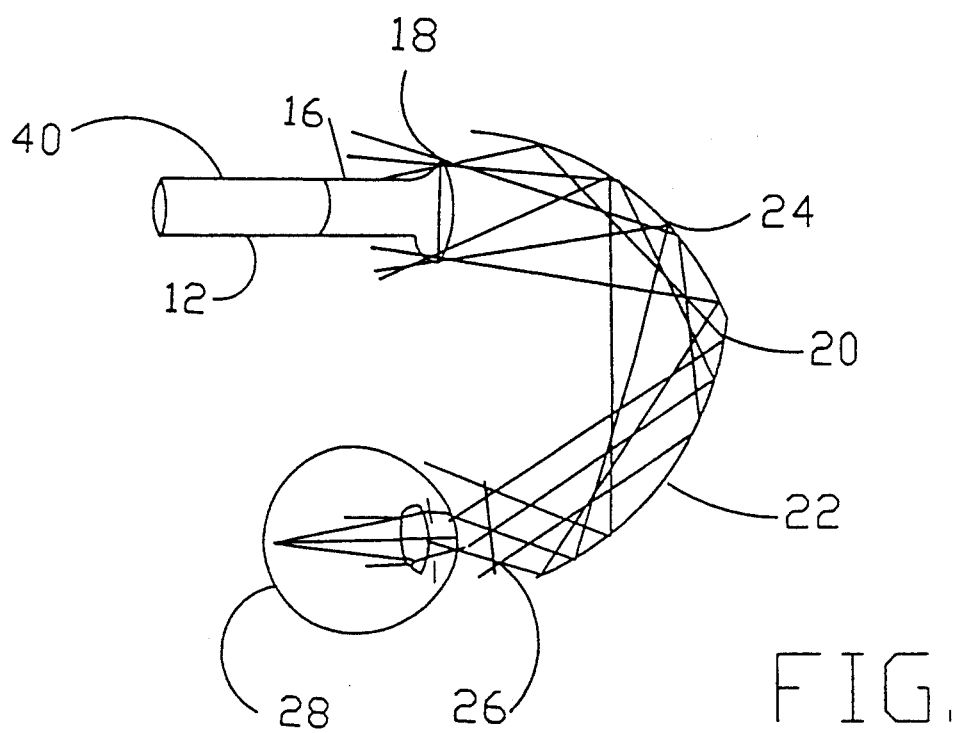
FIG. 1B ray trace of a retrocollimator optic with an upper paraboloid section and a lower spherical section.
Figure 1C:
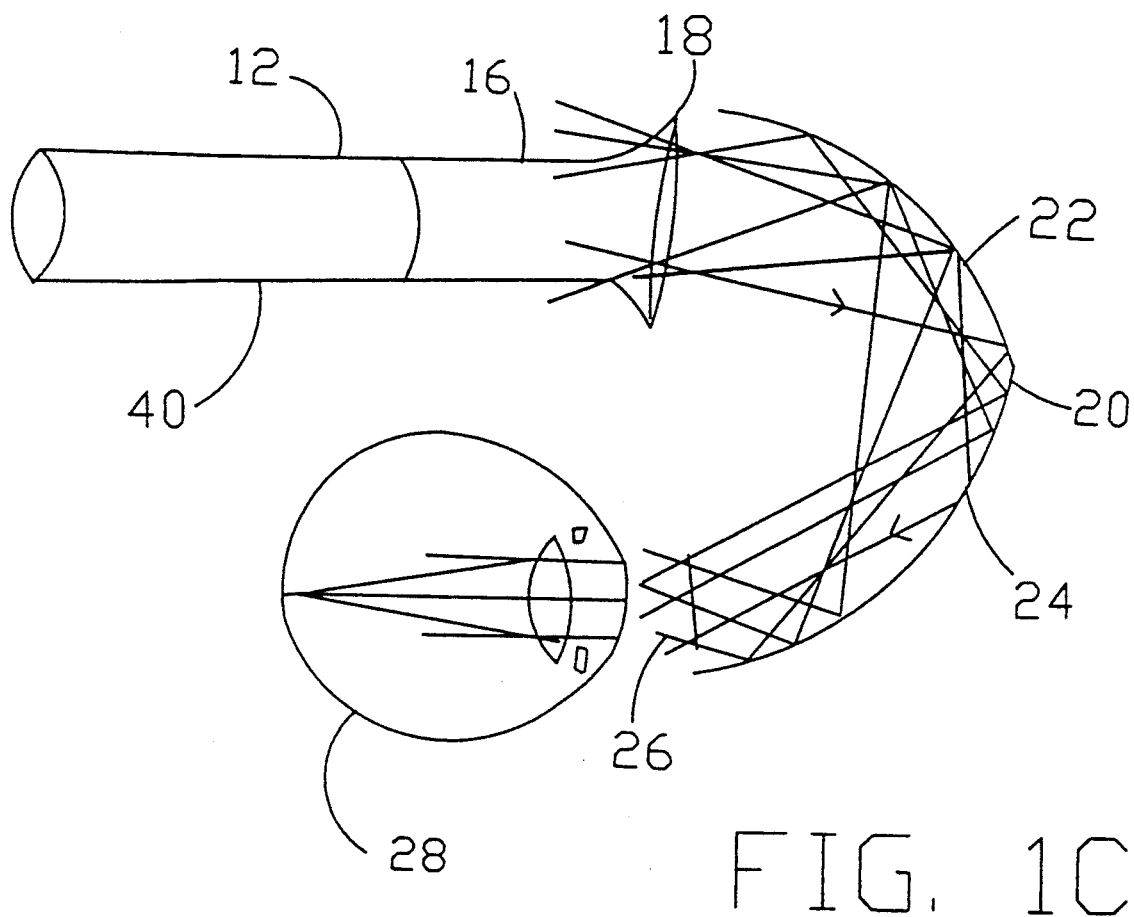
FIG. 1C ray trace of a retrocollimator optic with an upper spheroid section and a lower paraboloid section.
Figure 1D:
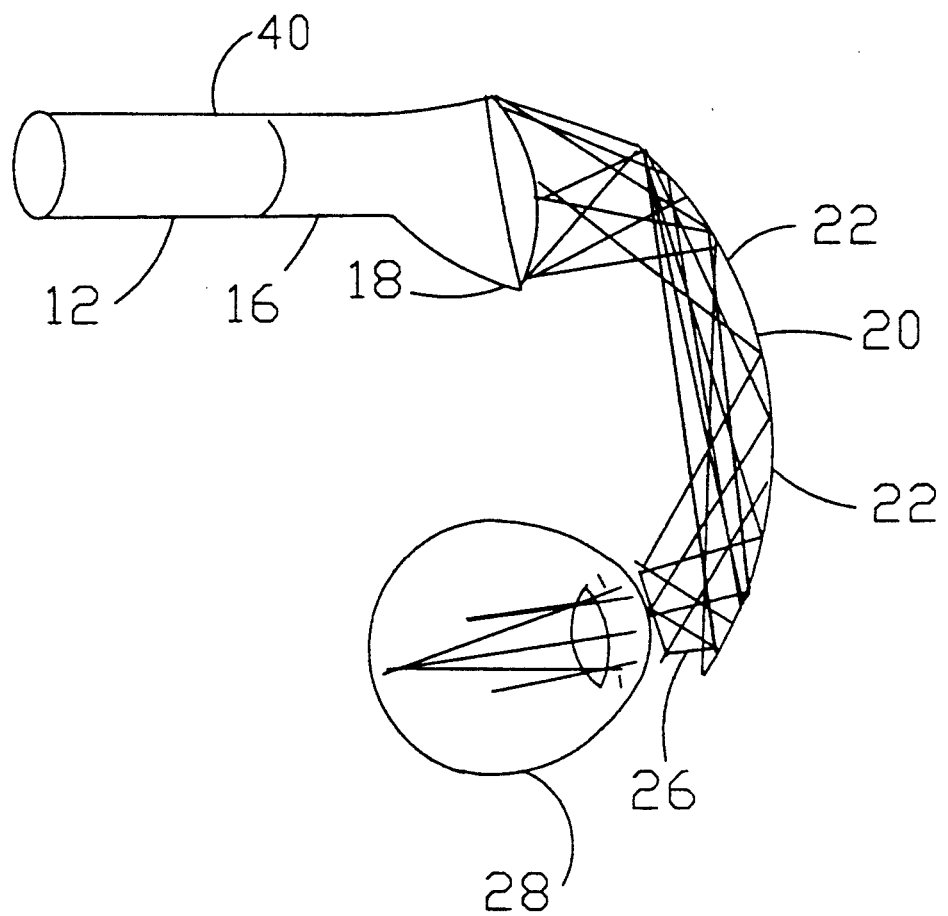
FIG. 1D ray trace of a retrocollimator optic with an upper and lower spheroid section.
Figure 2:
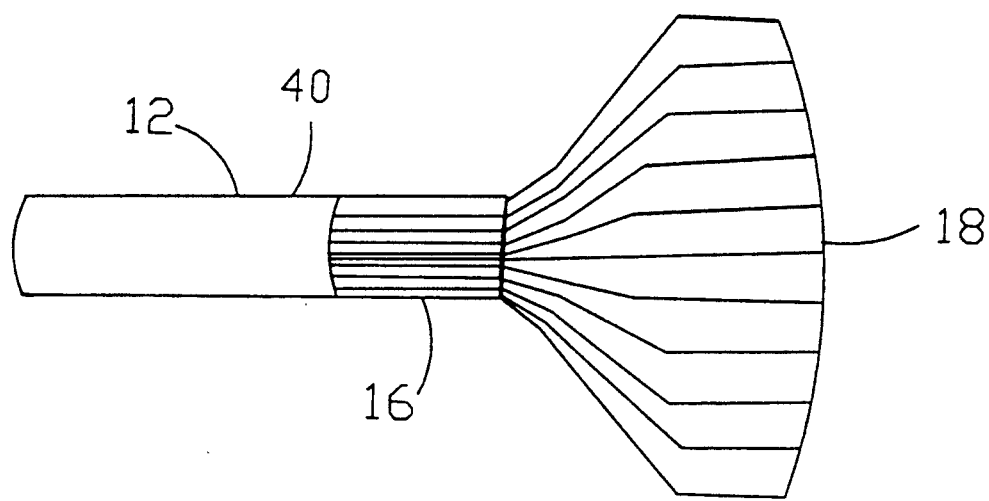
FIG. 2 projector with fiber optic taper.

The main component, of this invention is the retrocollimator optic 20. The retrocollimator optic 20 consist of at least one cup having spherical 22, paraboloid 24 or a combination of spherical 22 and paraboloid 24 sections (FIGS. 1a & 1b, 22, 24). For the preferred embodiment of this invention, two projectors 40 are mounted on a helmet 10. The projector consists of a CRT 12, and a fiber optic bundle 16 terminating in a contoured fiberoptic taper, 18. Optical aberrations that might be produced by the retrocollimator optic, including spherical aberration, coma, oblique astigmatism, and curvature of field are reduced by directing an image through a contoured fiber optic taper 18 The fiberoptic taper is ground at its terminus in a manner that reduces the above aberrations. Electronics are used to predistort the CRT image to correct for optical barrel and pincushion distortion. It is also possible, but less desirable, to substitute lenses for the contoured fiber optic taper 18 and perhaps the fiber optic bundle 16.

The projector can be mounted on a helmet using several approaches. The most desirable method of mounting the projector on the helmet is shown in FIGS. 3b and 3c. The projector 40 is mounted on a CRT mount 38. The CRT mount terminates with a plunger 36 that fits into a lug 30 that has a collar 34. Other methods of mounting that are available but less desirable include mounting the projector 40 in tubes on the side of the helmet and adjusting the image by moving the CRT backward or forward in the tube, or repositioning the retrocollimator optics 20.

The manner of using the retrocollimator is as follows:

(a) The invention takes an image that is derived from an image source such as a video camera, or a computer generated image and electronically processes the image to predistort the image thus correcting for barrel and pin cushion types of distortion, if necessary.

(b) The image is then slightly magnified as it passes through a lens or, in the preferred embodiment, a fiber optic bundle 16, and contoured fiberoptic taper 18. Some optical aberrations in the final image are corrected by relaying the image through a contoured fiber optic taper 18 or, alternatively but less desirably, through a corrective lens, thus producing a corrected image.

Figure 3A:
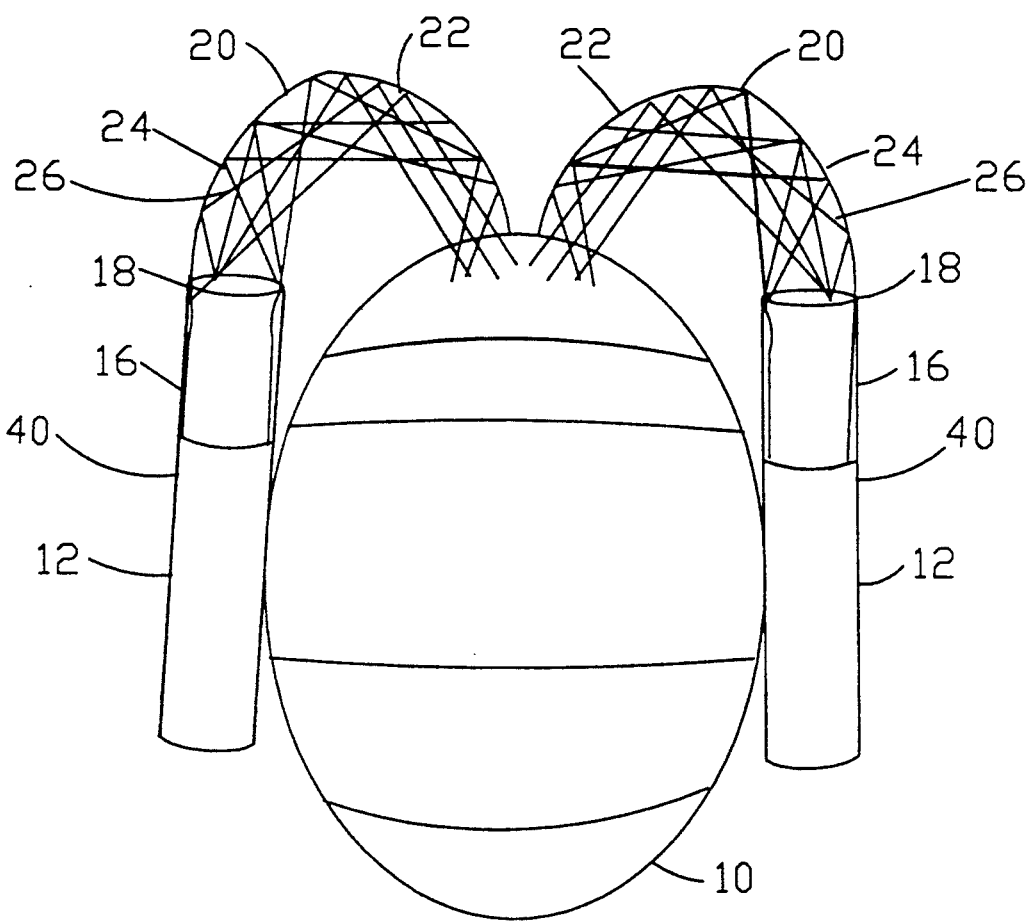
Figure 3B:
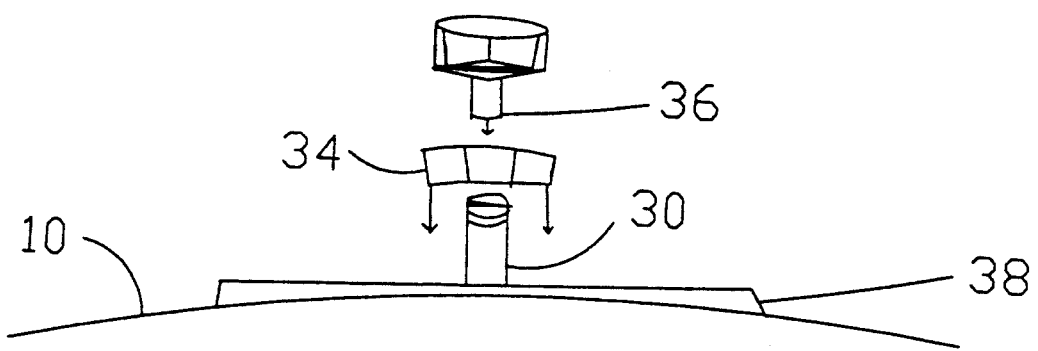
FIG. 3B preferred embodiment of helmet mount for projector.
Figure 3C:
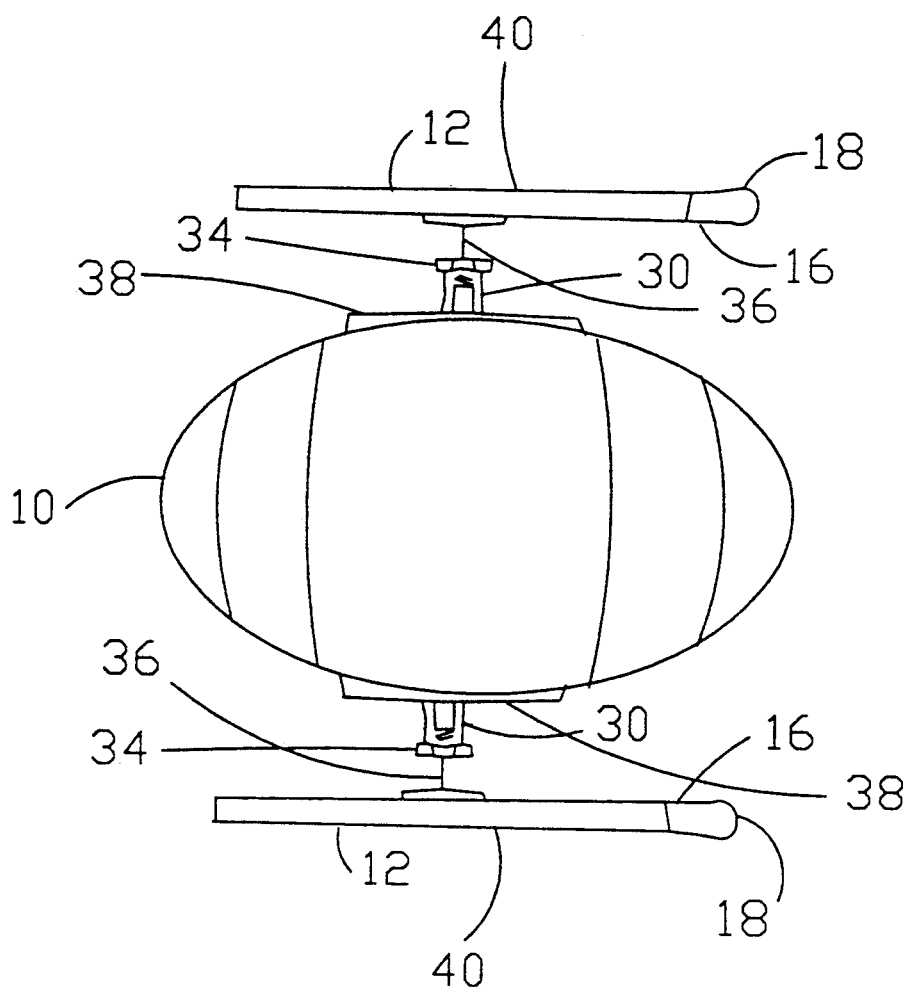
Figure 4:
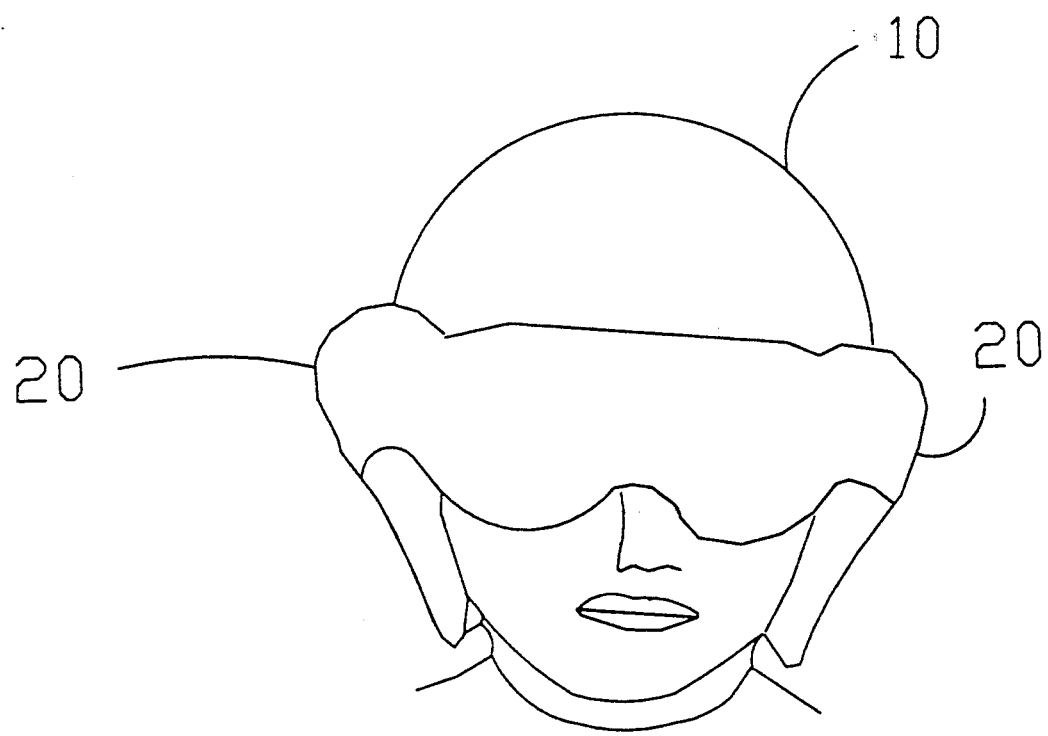
FIG. 4 frontal view of retrocollimator.

(c) The light is then directed into the retrocollimator optic in the manner displayed in FIGS. 1A through 1D and in FIG. 3A. The ray path 26 of the image is then directed into the eye 28 of the viewer. The image is adjusted by the movement of the plunger 36 in or out of the collar, 34, lug 30 assembly or, less desirably, by moving the retrocollimator or projector backward or forward.

Accordingly, the retrocollimator system can be mounted on a helmet and project a wide field of view, high quality virtual image into the eye of the wearer at a low cost and without any significant discomfort.

Although the description above contains many specificities, these should not be construed as limiting the scope of the invention but as merely providing illustrations of some of the currently preferred embodiments of this invention. For example, is not necessary for the optical system to be mounted on a helmet. The retrocollimator could be mounted on a jig or in a case. The retrocollimator can be monocular or binocular (the binocular embodiment is preferable because it can generate stereoscopic images. The retrocollimator can be increased or decreased in size for special applications. For example, one could increase the size of the retrocollimator to a point where one could have multiple viewers. One could make the retrocollimator optic semiopaque if the application required that the projected image be superimposed on the real world, or opaque for other applications.

Thus the scope of the invention should be determined by the appended claims and their legal equivalents, rather than by the examples given.

I claim:

1. A mountable optical system, comprising:
   (a) a retrocollimator optic with a clamshell geometry formed by two curved surfaces with conic section cross sections which intersect at a curved line thus forming a continuous inner surface mounted so as to intercept an optical image and thereafter reflect the image into the eye of the observer; and
   (b) a means for projecting an optical image into said retrocollimator optic.

2. A mountable optical system as described in claim 1 wherein said means for projecting an optical image is a projector, comprising:
   (a) an optical image;
   (b) an electronically encoded image; and
   (c) a means for converting said electronically encoded image into an optical image.

3. A mountable optical system as described in claim 1 wherein a means for correcting optical aberrations is mounted in such a manner as to intercept said optical image from said projector, creating a corrected image for projection into said retrocollimator optic.

4. A mountable optical system as recited in claim 1 wherein said retrocollimator optic is formed by paraboloidal and spherical surfaces which intersect at a curved line mounted to intercept said corrected image and thereafter reflect the image into the eye of the observer.

5. A mountable optical system as recited in claim 1 wherein said retrocollimator optic is formed by paraboloidal surfaces which Intersect at a curved line mounted to intercept said corrected image and thereafter reflect the image into the eye of the observer.

6. A mountable optical system as recited in claim 1 wherein said retrocollimator optic is formed by spherical surfaces which Intersect at a curved line mounted to intercept said corrected image and thereafter reflect the image into the eye of the observer.

7. A mountable optical system as recited in claim 3 wherein said means for correcting optical aberrations is a corrective lens.

* * * * *

UNITED STATES PATENT AND TRADEMARK OFFICE
CERTIFICATE OF CORRECTION

PATENT NO. : 5,293,271

DATED : March 8, 1994

INVENTOR(S) : Nelson Merritt

It is certified that error appears in the above-indentified patent and that said Letters Patent is hereby corrected as shown below:

TITLE PAGE:

In section [75] titled Inventors,
delete "; Arden Strasser, New Haven, Conn."

Signed and Sealed this

Nineteenth Day of April, 1994

Attest:

BRUCE LEHMAN

Attesting Officer       Commissioner of Patents and Trademarks